May 31, 1960  U. NISTRI  2,938,428
AUTOGRAPHIC PHOTOGRAMMETRIC RESTITUTION DEVICES
Filed Feb. 4, 1958  4 Sheets-Sheet 1

INVENTOR.
Umberto Nistri
BY
ATTORNEYS

INVENTOR.
Umberto Nistri

May 31, 1960 U. NISTRI 2,938,428
AUTOGRAPHIC PHOTOGRAMMETRIC RESTITUTION DEVICES
Filed Feb. 4, 1958 4 Sheets-Sheet 3

INVENTOR.
Umberto Nistri
BY Richards & Geier
ATTORNEYS

May 31, 1960  U. NISTRI  2,938,428
AUTOGRAPHIC PHOTOGRAMMETRIC RESTITUTION DEVICES
Filed Feb. 4, 1958  4 Sheets-Sheet 4

INVENTOR.
Umberto Nistri

United States Patent Office

2,938,428
Patented May 31, 1960

2,938,428

AUTOGRAPHIC PHOTOGRAMMETRIC RESTITUTION DEVICES

Umberto Nistri, Via della Vasca Navale 81, Rome, Italy

Filed Feb. 4, 1958, Ser. No. 713,191

Claims priority, application Italy Mar. 2, 1957

7 Claims. (Cl. 88—24)

In the autographic photogrammetric restitution devices, based on the principle of the double direct optical projection, when projectors are used which are of the same size as the camera, the problem arises of lighting the picture frame to project it upon the reading surface, where the mobile marker is located.

While in multiple restitution devices, in which the size of the projection camera is considerably reduced, it is possible to use optical condensers (which convey the light through the camera lenses) of reasonable weight and bulk, in the restitution devices using large-size picture frames the bulk and weight of the optical condensers and of the lighting system in general become so large as to make it impossible or very difficult to design mechanical devices capable of supporting them, and at the same time ensuring the necessary degree of precision of the delicate mechanical system which provides the restitution of the optical model. Thus, it became necessary to use systems that light partially the surface of the picture frame, and track the marker in its movement in space in order to maintain constantly lighted the portion of the frame which contains the point observed on the ground.

In the restitution devices of the latter type, developed to this date, the said objective is achieved by Cardan suspensions, the center of which coincides with the center of the optical system of the camera. These Cardan suspensions support, on both sides of the camera, two arms, one of which, on the side of the picture frame, carries the lighting system, while the other, on the side of the lens, actuates a rod which passes near the marker and is appropriately linked to the projection screen or surface on which the marker is engraved, which screen or surface is designed to move along the three perpendicular coordinates typical of the photogrammetric restitution devices. When, either mechanically or manually, the said screen is moved, the said rod, through the Cardan suspension, moves the lighting system, which is thus kept in alignment with the line from the optical center of the camera and the center of the marker.

But since two projection cameras are provided, for the purpose of forming the optical model, the screen is connected with two rods, linked to the Cardan suspensions actuating the lighting systems of each camera. In order to permit the free observation of the images on the screen, the two rods are appropriately removed, by means of suitable mechanical devices, from each line connecting the optical center of the camera with the marker, while actuating the lighting system through the respective Cardan joint.

This system has proved impractical in restitution work, because it forces the operator to maintain the line joining the two rod supports, which are positioned symmetrically with respect to the marker, approximately parallel to the line joining the optical centers of the two cameras, in order to maintain the two circles of light from the cameras in coincidence and centered on the marker, because any rotation of the said line adversely affects the observation. This disadvantage, of course, is particularly serious in the case of simplified restitution devices, in which the screen is moved manually by the operator, without using mechanical drives.

The purpose of this invention is to obviate these disadvantages by achieving simultaneous control of the two lighting systems by means of a single mechanical rod, suitably connected to the screen bearing the marker, so as to maintain the coincidence of the two light circles, regardless of the operations performed by the operator, who has only to control the screen and maintain it approximately in the lighted field resulting from the coincidence of the lighted circles from the cameras.

The device covered by this invention is illustrated in the enclosed drawings.

Figure 1:
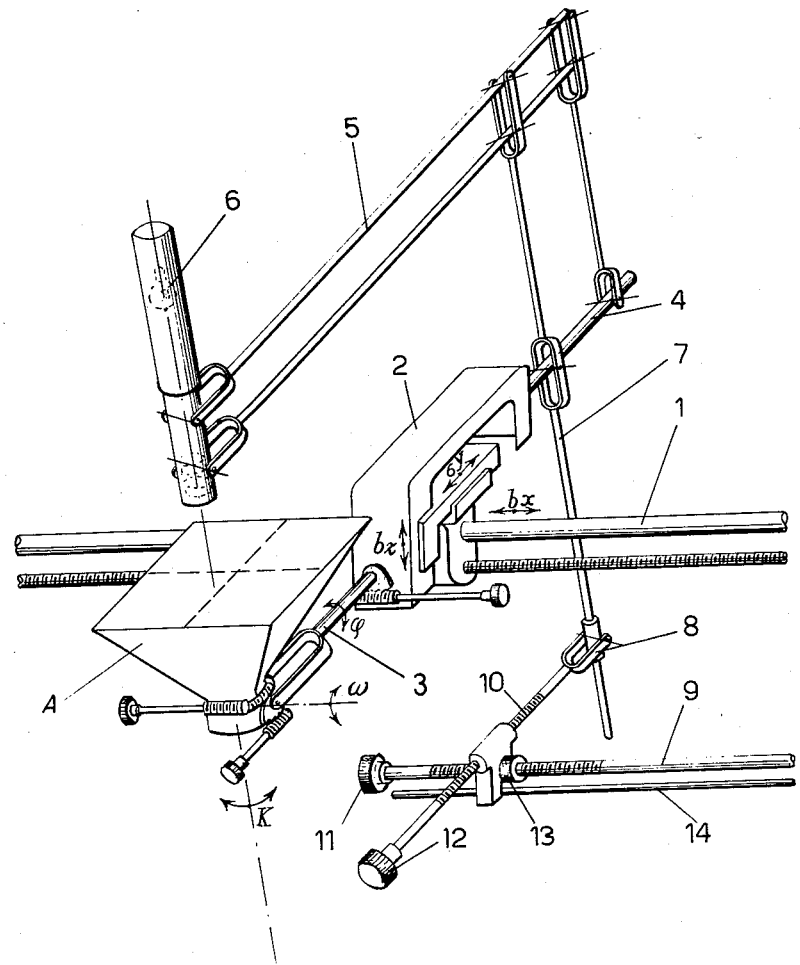
Fig. 1 shows an element of the restitution device with one of the cameras and the lighting system.

Upon the bar 1 (Fig. 1), which in the restitution device is common to the two cameras A and B, and is oriented along axis X of the X—Y—Z system of instrument axes, is mounted a support 2 of known form, which allows the camera to perform the three space movements $b_x$, $b_y$, and $b_z$ in the direction of the axes X, Y and Z, and the three angular rotations $\omega$, $\varphi$ and $\kappa$ to permit the restitution of the optical model. The shaft 3 of the rotation $\varphi$ coincides with the direction of the axis Y of the system; in line with shaft 3, but on the opposite side of the slide which supports it, is fixed a second shaft 4 which supports a parallelogram 5 of suitable form which carries the lighting system 6. The parallelogram, rotating around the axis 4 and in its plant, allows the light beam to pass always through the second nodal point of the camera lens A.

The parallelogram arm 7, having the direction of the light beam emerging from the camera, is connected through a Cardan system 8, which also permits the said arm 7 to move axially, to a system of screws 9 and 10 at 90° to each other, parallel respectively to the instrument axes X and Y, which, by means of adjustment knobs 11 and 12, allow the operator to change the distance of the Cardan 8 from the center of the orthogonal system which links the said screws 9 and 10, and by means of control knob 13 to vary the distance from the said center, independently of knob 11, for the reasons indicated below.

The purpose of the shaft 14 is to maintain screw 10 in unchanged position on the desired plane. The distance of the Cardan 8 from the shaft 4, when the arm 7 is perpendicular to the plane XY of the restitution device, may be equal to the principal distance of the camera, or to another value in a known ratio of the latter.

Figure 2:
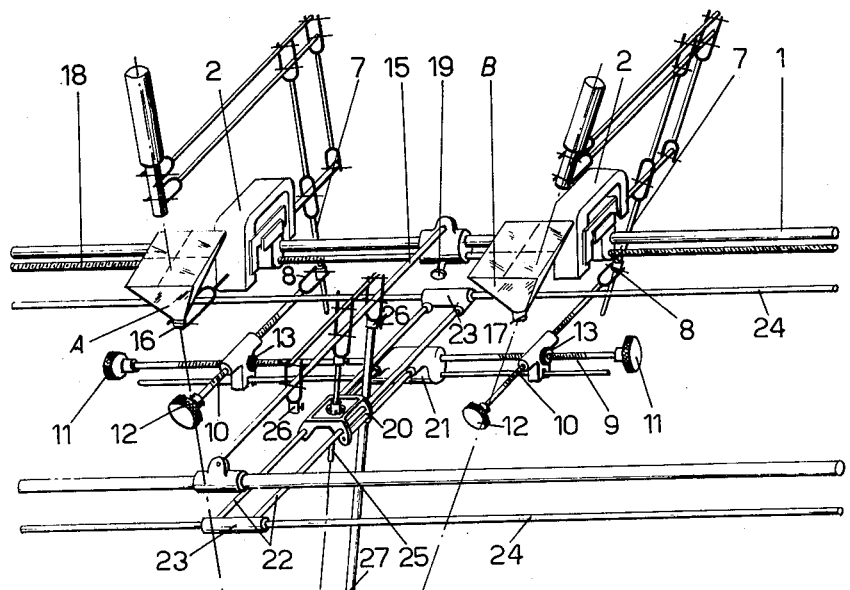
Fig. 2 shows the arrangement for the simultaneous control of the two lighting systems of the cameras by means of a single rod.

In Fig. 2, two systems as described above, are mounted on the bar 1, symmetrically to each other and with respect to a shaft 15 in the direction Y; this shaft is positioned at the height of the projection centers of the cameras 16 and 17, when the latter are about in the middle of their travel $b_z$ (parallel to instrument axis Z). The screw 18, actuated by knob 19, is capable of varying the distance between the two cameras, the latter remaining always symmetrical and at equal ditstance from the shaft 15, the two symmetrical halves of the screw being threaded in opposite directions.

The systems of the screws 9 and 10, which control the Cardans 8 on the arms 7 of the lighting-system parallelograms, are carried by slide 20 through the support 21. The two screws 9 are threaded on the same shaft in opposite directions; thus actuating either of knobs 11, the operator can vary the distance between the screws 10 and consequently between the centers of the Cardans 8, symmetrically with respect to the shaft of the slide 20, which lies in the direction of the axis Y. By rotating the knobs 13, the operator can change the distances between the Cardans 8, each of which is controlled separately and not both symmetrically with respect to the shaft of slide 20.

Slide 20 can be moved on slide bars 22 in the direction Y, and by means of slides 23 and slide guides 24, it can be moved in the direction X.

On the center of slide 20 is mounted a Cardan, through the center of which passes and can slide a rod 25, which is pivoted on the shaft 15, parallel to the direction Y and having the same coordinate Z of the two projections centers 16 and 17 of the cameras, when the latter are in the middle of their travel $b_z$.

The rod 25, by means of the parallelogram shown in the drawing, lying in the plane YZ, actuates the two devices 26, symmetrical with respect to the rod 25, on either of which can be engaged the rod 27, which establishes a link between the movements of the slide 20 and those of the screen 28. The rod 27 is built of telescoping parts, so that its length can vary according to the angle it forms with plane XY.

Figure 3:
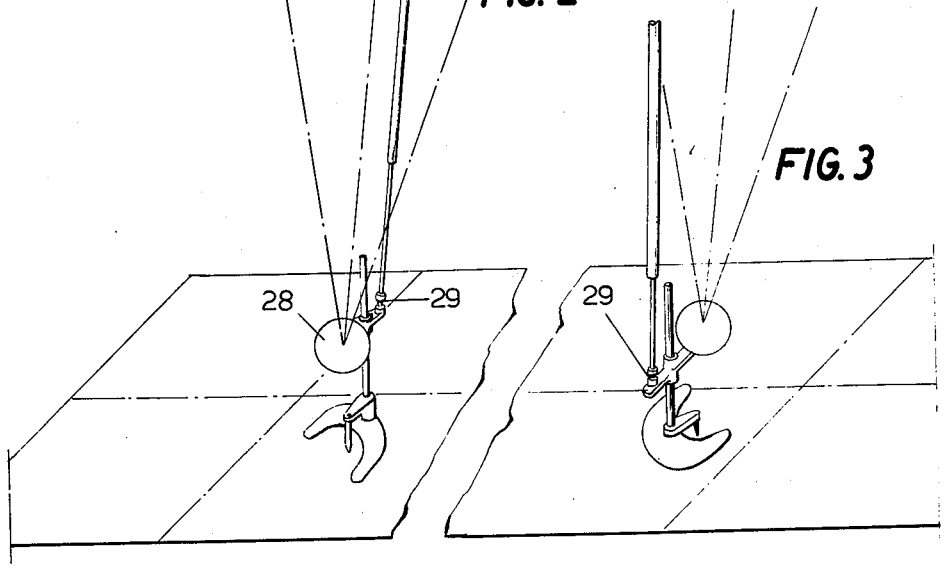
Figs. 3, 4 and 5 show the linkage between the screen and the lighting system control rod, and certain variations thereof.
Figures 4, 5:
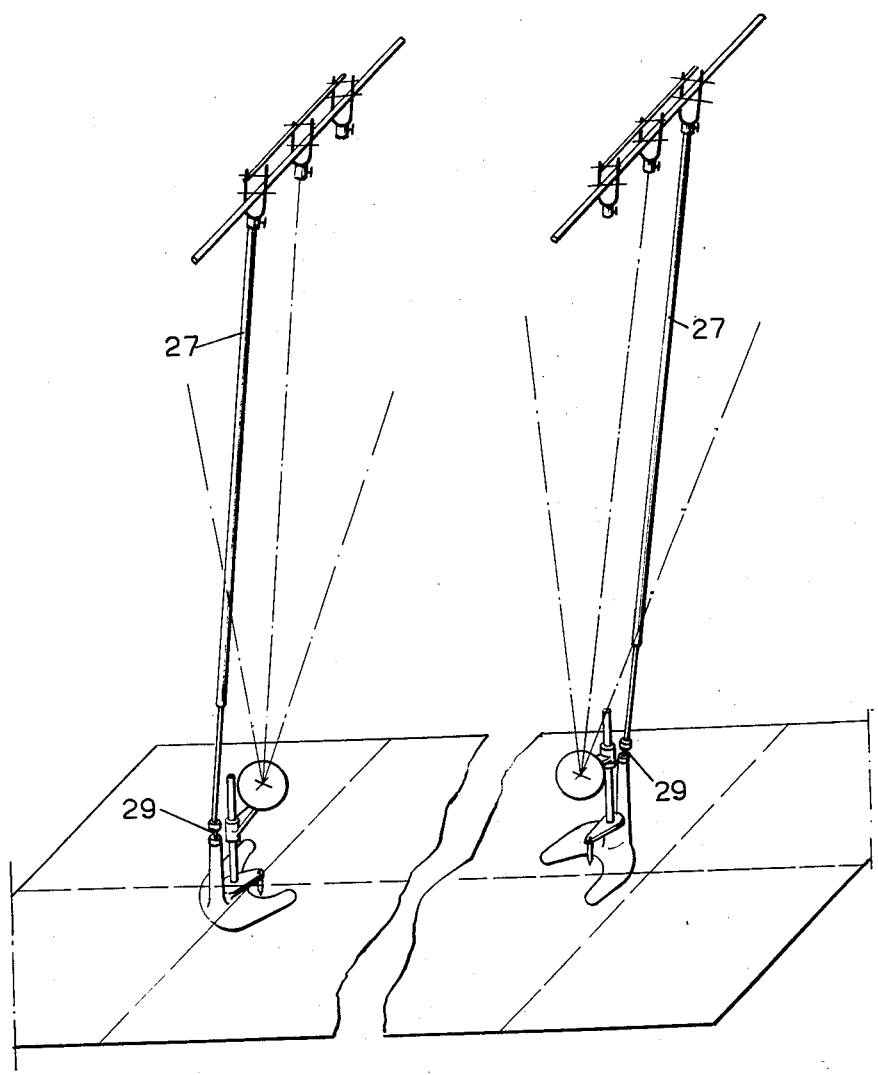

The rod 27 is connected to the screen carrying the marker by means of a Cardan system 29, which can be connected directly (Fig. 3) to the said screen, in which case it moves with it also along Z, or connected to the foot of the screen carrying the marker, in which case it does not move along Z of the screen (Fig. 4).

In Fig. 2 the rod 27 is fastened to the connector 26 which permits an easier observation of the front half of the optical model, while in Fig. 3 it is fastened to the other connector 26, which affords the same ease for the rear half of the model. The same circumstances are shown in Figs. 4 and 5. The distance between the control rod 25 of slide 20 (Fig. 2) and the connectors 26 of shaft 27, symmetrical to it, must be equal to the horizontal distance between the screen marker 28 and the center of the Cardan 29 which links the rod 27 to the said screen.

During the reconstruction of the optical model, the operator, by adjusting the knobs 11, 12 and 13, maintains the two light discs from the objective lenses of the cameras centered on the marker screen 28, whatever its position is. Once the optical model is constructed, for any movement of the screen and without adjusting the said knobs 11, 12 and 13, the two light circles are always projected on the screen, because the segment of the straight line, the ends of which lie in the centers of the two Cardans 8 of the control of the camera lighting parallelograms, keeps its length unchanged and moves in a plane which is always parallel to that of XY.

While with the arrangement shown in Figures 2 and 3, the rod following the movement in Z direction of the marker screen 28, the above condition occurs (i.e. no need for further adjusting the direction of projection of the two light circles), in the arrangement shown in Figs. 4 and 5 the coincidence of the two circles on the screen is obtained only with a degree of approximation. In this case, however, the diameter of the light circles is large enough to ensure the said coincidence to an adequate degree on the center part of the screen, i.e. opposite the marker, even when the excursions Z of the screen are very marked.

Figure 6:
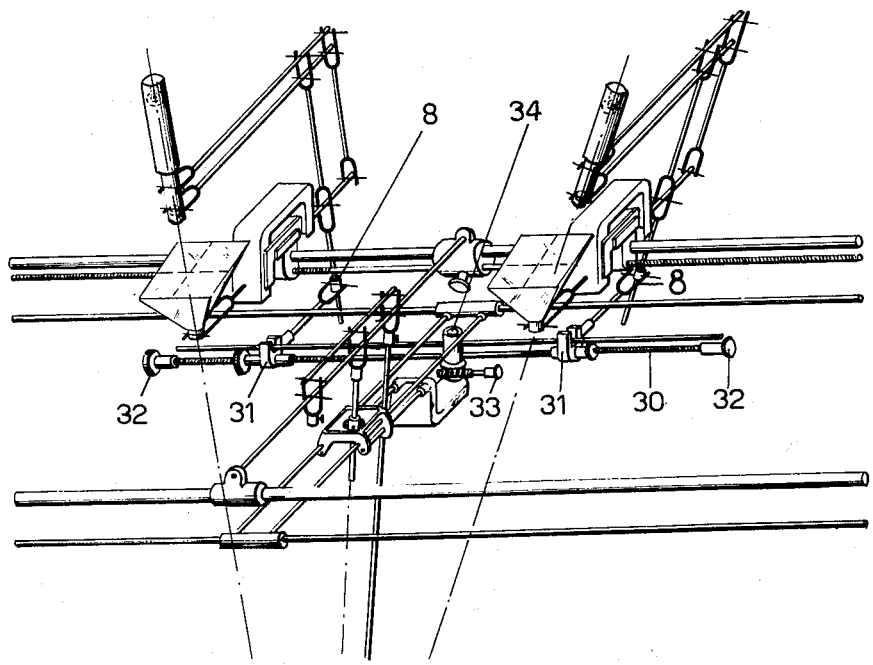
Fig. 6 shows a variation of the above system.

Fig. 6 represents a variation of the device for the control of the two arms of the parallelogram carrying the lighting system. In this variation the device of the arms, lying in the directions of the instrument axes X and Y, which serve to determine the distance and lay of the segment of straight line passing between the lighting-system Cardan 8, consists of a single shaft 30, carrying two screws, threaded in opposite directions, upon which are mounted the two supports 31 linked to the Cardans 8.

By adjusting the knobs 32, the operator can vary the distance between the two centers of the Cardans 8, i.e. the length of the segment of straight line passing between these Cardans, while acting on the knob 33 the shaft 30 can be rotated around the pivot 34, thus making the said straight line assume the desired angle with respect to instrument axes X and Y.

The two systems are equivalent as far as the result is concerned, because with both of them the coincidence of the light circles on the marker screen can be achieved and maintained as the latter is moved over the projection screen.

What I claim is:

1. In an autographic photogrammetric device, in combination, a shaft, two projection cameras located symmetrically to said shaft on opposite sides thereof, screw means connected with said cameras and said shaft for varying the distance of said cameras from said shaft while maintaining said cameras in symmetrical location relatively to said shaft, a guide bar carried by said cameras and extending perpendicularly to said shaft, a pair of slide bars extending parallel to said shaft, another pair of slide bars extending parallel to said guide bar, a carriage carried by one of said pair of slide bars, another carriage, screw control means connected with said two carriages and said two pairs of slide bars for moving said carriages selectively in the directions of said shaft and said guide bar, two supports, each support being carried by said guide bar and connected with said screw means, two other shafts, each of said other shafts being connected to a separate one of said cameras and extending parallel to the first-mentioned shaft and into a separate one of said supports, said other shafts being turnable relatively to the supports, two further shafts, each of said further shafts being connected to a separate support and extending in alinement with a separate one of said other shafts, two articulated parallelograms, each of said parallelograms being connected to a separate one of said further shafts, two lighting systems, each lighting system being carried by a separate parallelogram and emitting a light beam passing through a nodal point of a separate camera, each of said parallelograms having a separate extended portion extending in the direction of the light beam, universal joints slidably mounted on said extended portions and connected with said screw control means, a further universal joint carried by the first-mentioned carriage, a rod slidable in the further universal joint and pivotally connected with the first-mentioned shaft, a screen marker, a telscopic rod, means connecting said telescopic rod with said screen marker, and means connected with the first-mentioned shaft and operatively connecting said slidable rod with said telescopic rod, whereby said two cameras are each movable in three directions constituting a Cartesian system.

2. A device in accordance with claim 1, wherein the two first-mentioned universal joints are located at the level of the median position of the centers of projection of said two cameras relatively to the horizon.

3. A device in accordance with claim 1, wherein the last-mentioned means maintain said telescopic rod parallel to said slidable rod.

4. A device in accordance with claim 1, wherein said screw-control means comprise nuts, threaded rods meshing with said nuts, and knobs connected with said threaded rods.

5. A device in accordance with claim 1, wherein said screw means have portions of opposite pitch for maintaining the symmetrical location of said cameras.

6. A device in accordance with claim 1, wherein the last-mentioned means comprise two connectors pivotally connected to the first-mentioned shaft and located symmetrically on opposite sides of the longitudinal axis of said slidable rod, said telescopic rod being selectively connected to one of said two connectors.

7. A device in accordance with claim 6, wherein the means connecting said telescopic rod with said screen marker comprise a universal joint, the distance of the last-mentioned universal joint from said screen marker being equal to the distance between any one of said connectors and said longitudinal axis of the slidable rod.

References Cited in the file of this patent

UNITED STATES PATENTS

| | | |
|---|---|---|
| 2,552,975 | Kelsh | May 15, 1951 |
| 2,747,461 | Boughton et al. | May 29, 1956 |